United States Patent [19]

Katayama et al.

[11] Patent Number: 5,121,448
[45] Date of Patent: Jun. 9, 1992

[54] METHOD OF AND APPARATUS FOR HIGH-SPEED EDITING OF PROGRESSIVELY-ENCODED IMAGES

[75] Inventors: Akihiro Katayama, Kawasaki; Yasuji Hirabayashi, Tokyo, both of Japan

[73] Assignee: Canon Kabushiki Kaisha, Tokyo, Japan

[21] Appl. No.: 504,624

[22] Filed: Apr. 4, 1990

[30] Foreign Application Priority Data

Apr. 10, 1989 [JP] Japan .................................. 1-90072

[51] Int. Cl.⁵ .............................................. G06K 9/03
[52] U.S. Cl. ......................................... 382/57; 387/61; 387/65
[58] Field of Search ...................... 382/57, 61, 65, 68, 382/47, 44, 27, 41, 54; 358/426, 429, 445, 448, 447, 467

[56] References Cited

U.S. PATENT DOCUMENTS

| | | | |
|---|---|---|---|
| 3,969,700 | 7/1976 | Bollinger et al. | 382/57 |
| 4,665,555 | 5/1987 | Alker et al. | 382/57 |
| 4,727,588 | 2/1988 | Fox et al. | 382/57 |
| 4,782,397 | 11/1988 | Kimoto | 382/57 |
| 4,881,130 | 11/1989 | Hayashi | 382/57 |
| 4,907,283 | 3/1990 | Tanaka et al. | 382/57 |

*Primary Examiner*—Michael Razavi
*Attorney, Agent, or Firm*—Fitzpatrick, Cella, Harper & Scinto

[57] ABSTRACT

There is disclosed an image editing method and apparatus wherein low resolution image data among hierarchically encoded image data are decoded, the decoded low resolution image data are subjected to editing, editing data representative of the editing are stored, the hierarchically encoded image data are decoded to obtain original image data, and the decoded original image data are subjected to the editing in accordance with stored editing data.

11 Claims, 5 Drawing Sheets

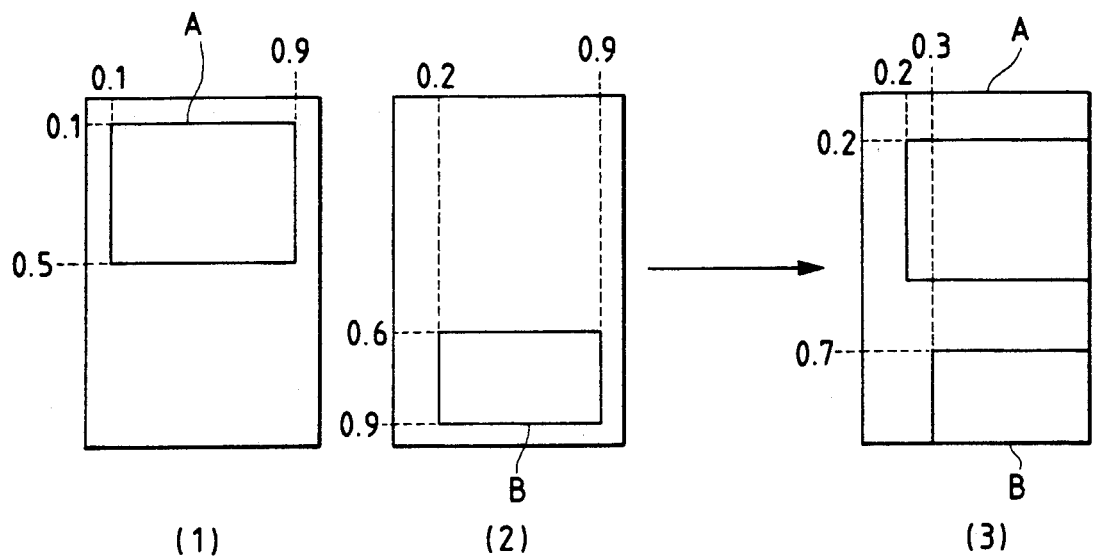

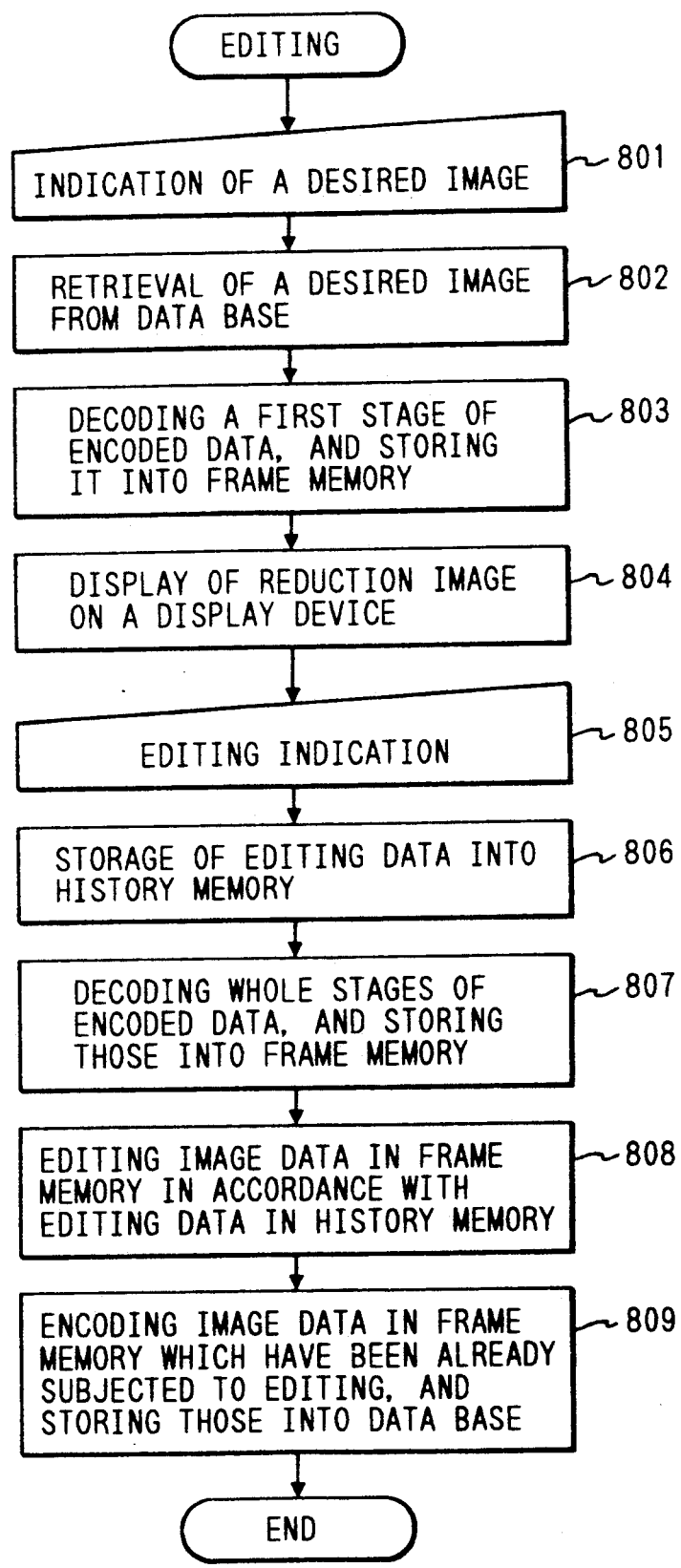

METHOD OF AND APPARATUS FOR HIGH-SPEED EDITING OF PROGRESSIVELY-ENCODED IMAGES

BACKGROUND OF THE INVENTION

1. Field of the Invention

The present invention relates to an image editing method and apparatus using progressive images.

2. Related Background Art

In a conventional method of editing a plurality of images stored in an image data base which stores data sequentially, the necessary images are read from the data base and written in frame memories. The images are processed in the frame memories for enlargement, reduction, rotation, layout or other processing, and thereafter they are combined together and written in another frame memory.

With the conventional method, original images themselves are used in editing. As the image data quantity and size become large, it takes an inpractically long time to edit images. A long editing time causes a slow response to an instruction from an operator so that the operator may sometimes lose patience. Images to be edited are first searched from a plurality of page data stored in the image data base and then transmitted. In this case it is required to display and transmit the whole image data in order to see and check it, thereby posing a problem of a long search and transmission time.

SUMMARY OF THE INVENTION

The present invention has been made in consideration of the above problems. It is an object of the present invention to provide an efficient image editing method and apparatus.

It is another object of the present invention to provide a high speed image editing method and apparatus.

It is a further object of the present invention to provide an image editing method and apparatus capable of readily obtaining the processing results in response to an instruction from an operator even for complicated editing processing.

The above and other objects and advantages of this invention will become apparent from the following detailed description when read in connection with the accompanying drawings.

BRIEF DESCRIPTION OF THE DRAWINGS

FIG. 6 illustrates the image cut-out and synthesis;

FIG. 7 shows the format of data in a history memory; and

FIG. 8 is a flow chart illustrating the editing operation.

DETAILED DESCRIPTION OF THE PREFERRED EMBODIMENT

Figure 1:
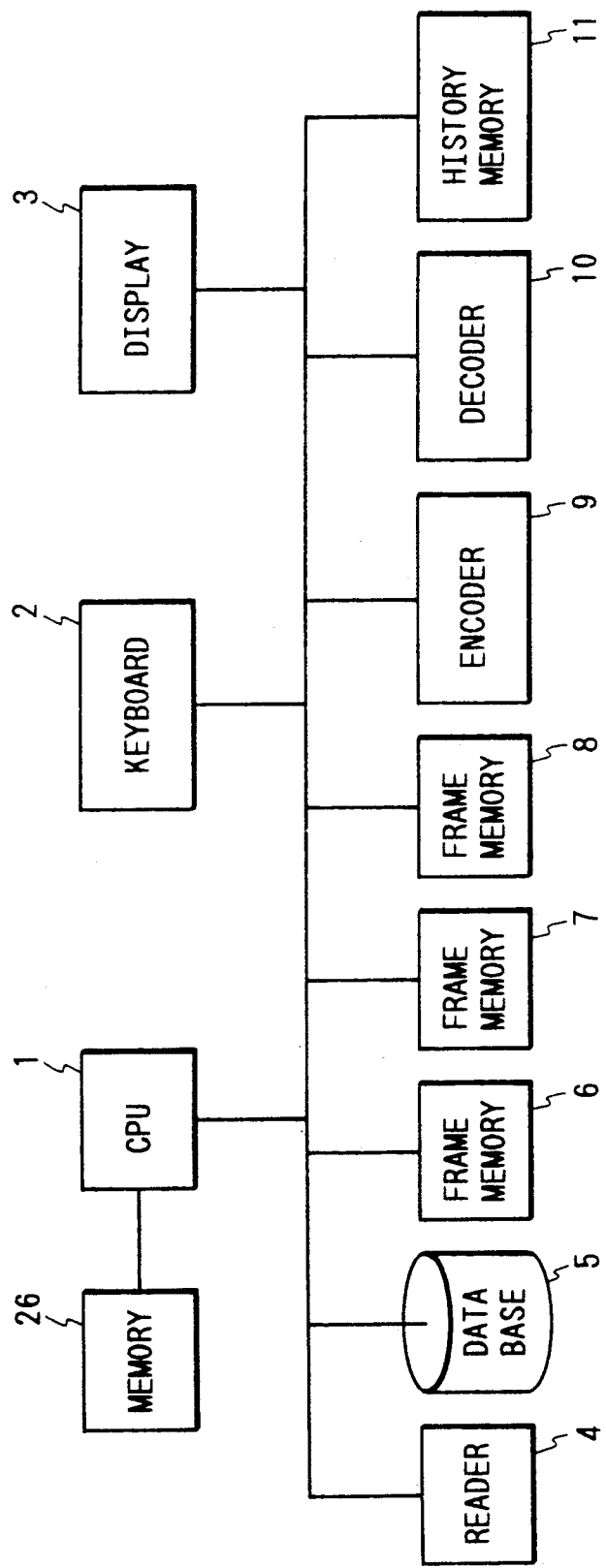
FIG. 1 is a block diagram showing an embodiment of this invention.

FIG. 1 is a block diagram showing an embodiment of an image editing apparatus of this invention. In FIG. 1, reference numeral 1 represents a control unit (CPU) for controlling the operation of the entirely of the image editing apparatus, 2 a keyboard from which an operator enters various commands for editing images, 3 a display unit for displaying images and characters, 4 a reader for photoelectrically reading an original image and supplying the image data to the apparatus, 5 a data base constructed of a magnetooptical disc or the like capable of storing a plurality of image data pages, 6, 7 and 8 frame memories constructed of one or more semiconductor memories or the like capable of storing at least one image data page or frame, 9 an encoder for encoding image data, 10 a decoder for decoding encoded image data, and 11 a history memory for storing editing procedure data.

The description will be given below for the case where images are read with the reader 4 and stored in the data base, a plurality of image data (in the description, two pages) are read from the data base and synthesized together, and the synthesized image data are stored in the data base 5.

A plurality of original image data inputted by the reader 4 are progressively encoded by the encoder 9. The encoded data are sequentially stored in the data base 5 in the order starting from the low resolution encoded data. Next, in accordance with an instruction entered by an operator via the keyboard 2, two images to be synthesized are searched out from a plurality of images stored in the data base 5. The lower resolution encoded data (first stage images) of the two searched image data are first read and decoded by the decoder 10. The decoded low resolution image data of two pages are stored in the frame memories 6 and 7 and correspond to reduced images of two pages to be synthesized. While monitoring the image data in the frame memories 6 and 7 displayed on the display unit 3, an operator enters an editing command via the keyboard 2 to conduct synthesizing processing, the editing procedure data of this processing being stored in the history memory 11.

After completion of the editing processing by using the reduced images, the encoded image data of two pages for all progressive stages are read from the data base 5 and decoded by the decoder 10 to form the original images. The original images are stored in the frame memories 6 and 7. Then, under control of CPU 1, the original images are edited in accordance with the editing procedure data stored in the history memory 11. The edited results are stored in the frame memory 8. The edited image data stored in the history memory 8 are progressively encoded by the encoder 9 and stored in the data base 5 in the order starting from the lower resolution encoded data.

As described above, an operator instructs to edit images by using progressively encoded data of lower resolution stored in the data base 5, thereby allowing high speed editing. In addition, the image data of low resolution are used in searching image data, thereby allowing high speed search.

Figure 2:
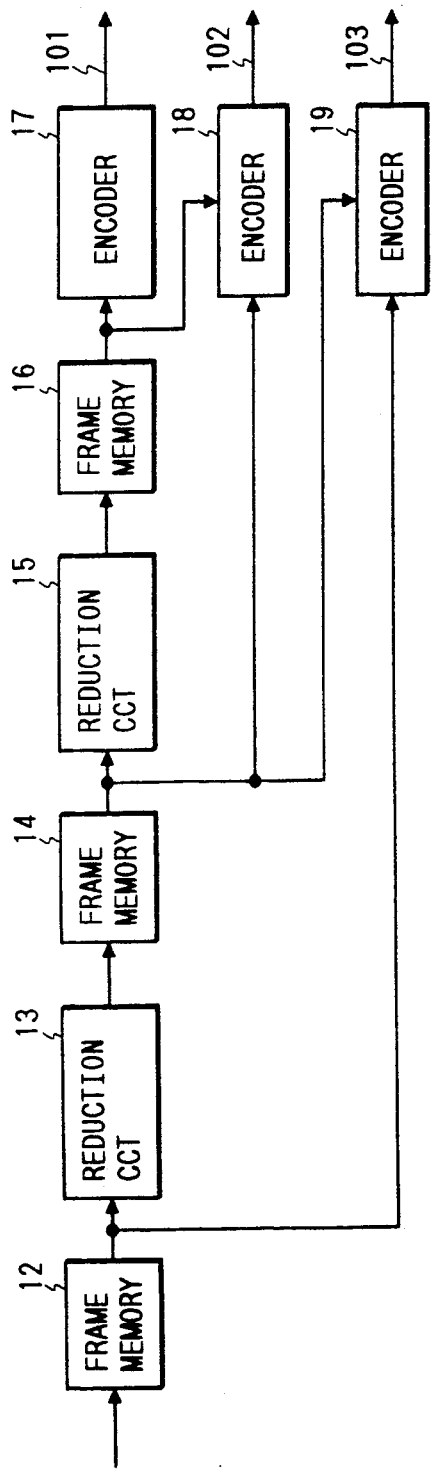
FIG. 2 is a block diagram of an encoder.

FIG. 2 is a block diagram showing the structure of the encoder 9 which is constructed of frame memories 12, 14 and 16, reduction circuits 13 and 15, and encoder units 17, 18 and 19. Original image data outputted from the reader 4 or frame memory 8 to be progressively encoded are stored in the frame memory 12. The original image data stored in the frame memory 12 are reduced by ½ both in the vertical and horizontal directions by the reduction circuit 13. The reduced image data are stored in the frame memory 14. Reducing the size may be performed by sampling the image at a sampling rate of 1/n (in this case, n=2) both in the vertical and horizontal directions, or by filtering the image using a low-pass filter, high pass filter, or recursive filter, subjecting the obtained value to a threshold processing, and thereafter sampling it. Any other reducing method may be used instead. The ½ size image data stored in the frame memory 14 are further reduced by ½ both in the vertical and horizontal directions and stored in the frame memory 16. Therefore, the image stored in the frame memory 16 is the original image reduced by ¼ in both the vertical and horizontal directions stored in the frame memory 12.

The image data stored in the frame memory 16 are subjected to an entropy encoding at the encoder unit 17 by means of an arithmetic encoding method, to thereby output encoded data 101 of the first stage. While referring to the image stored in the frame memory 16, the encoder unit 18 causes the image data stored in the frame memory 14 to be subjected to the entropy encoding, to thereby output encoded data 102 of the second stage. Similarly, while referring to the image data stored in the frame memory 14, the encoder unit 19 causes the image data stored in the frame memory 12 to be subjected to the entropy encoding, to thereby output encoded data 103 of the third stage. The image data progressively encoded as above are sequentially stored in the data base 5 in the order starting from the lower resolution encoded image data.

Although the above embodiment uses entropy encoding as the encoding method, the other methods may also be used. Further, the progressively encoded image data to be stored in the data base 5 may be transmitted to another system via a communication line.

Figure 3:
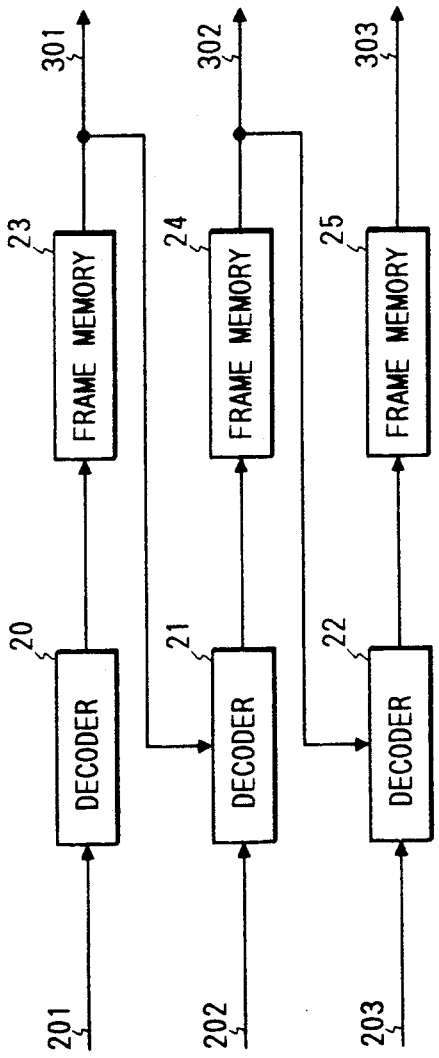
FIG. 3 is a block diagram of a decoder.

FIG. 3 is a block diagram showing the structure of the decoder which is constructed of decoder units 20, 21 and 22, and frame memories 23, 24 and 25. Encoded data 201 of the first stage (lower resolution) among the progressively encoded data stored in the data base 5 are inputted to the decoder unit 20 and decoded. The decoded results are stored in the frame memory 23 to thereby output decoded image data 301 of the first stage. In order to produce a reduced image to be used for the editing processing in response to an instruction from an operator, the decoding processing is stopped at this stage and the image data 301 are stored in the frame memories 6 and 7. Also in performing the image search, the image data 301 of the first stage are used.

The following processes are carried out thereafter in order to reproduce an original image. Encoded data 202 of the second stage among the progressively encoded data read from the data base 5 are inputted to the decoder unit 21. While referring to the image data stored at the first stage operation in the frame memory 23, the decoder unit 21 decodes the encoded data 202. The decoded results are stored in the frame memory 24 to thereby output decoded image data 302 of the second stage. Encoded data 203 of the third stage among the progressively encoded data read from the data base 5 are inputted to the decoder unit 22. While referring to the image data stored in the frame memory 24, the decoder unit 22 decodes the encoded data 203. The decoded results are stored in the frame memory 25 to thereby output image data 303 of the third stage. The image data thus stored in the frame memory 25 correspond to the original image prior to encoding. The image data 303 read from the frame memory 25 are also used by CPU 1 for the actual editing processing after the editing processing by an operator using reduced images.

As the reduced images for use with the editing processing, the progressive images of the first stage have been used in the above embodiment. Images of other stages may also be used. Further, in the above embodiment, although a progressive image having three stages has been used, an image having any number of stages may also be used.

As described above, by encoding and decoding progressively and using low resolution progressive image data, high speed editing processing can be attained. Further, by using low resolution image data, high image search can be attained. Furthermore, by decoding progressive image data of higher resolution, an original image can be efficiently reproduced.

Figure 4:
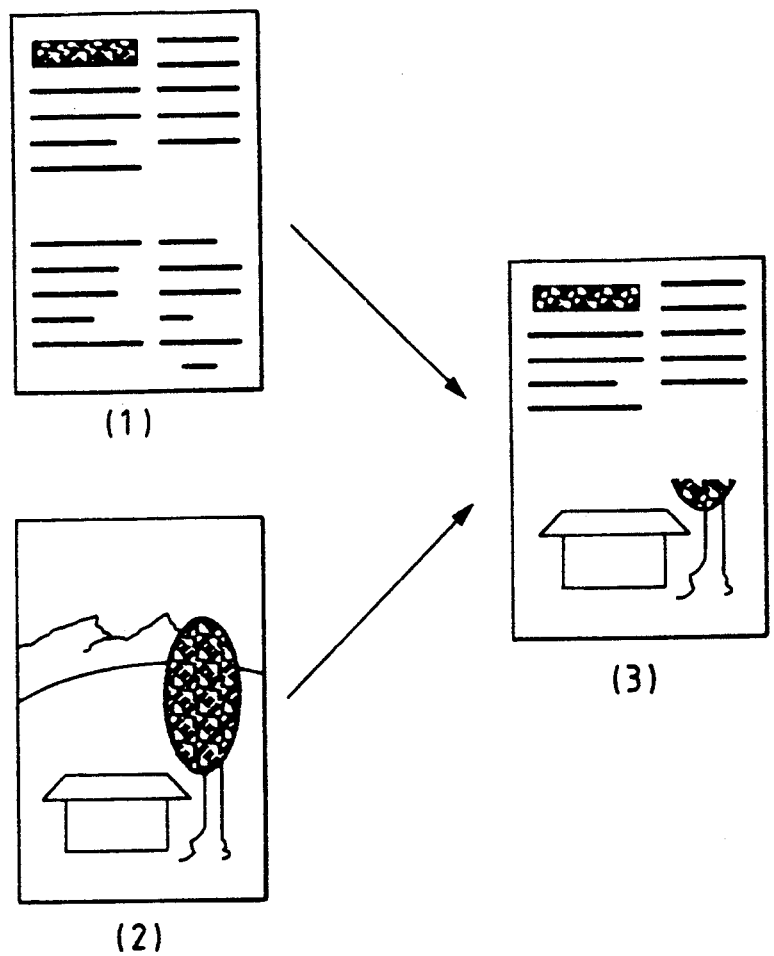
FIG. 4 shows an example of editing.

FIGS. 4 to 8 illustrate examples of an editing method. The description will be given below in connection with the flow chart shown in FIG. 8 for the case where as shown in FIG. 4, desired portions of two original images (1) and (2) are cut out and synthesized to form an image (3).

Figure 5:
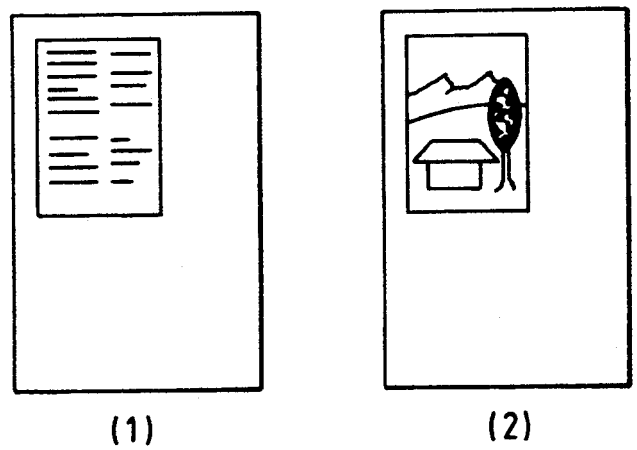
FIG. 5 shows an example of an image stored in frame memories 6 and 7.

Encoded data of two images of the first stage read (802) from the data base 5 in response to an instruction (801) from the keyboard 2 are decoded by the decoder 10 and stored in the frame memories 6 and 7 (803). These operations are illustrated in FIG. 5 (images (1) and (2)). Namely, the original image reduced by ¼ in both the vertical and horizontal directions is stored as the reduced image in the frame memories 6 and 7. CPU 1 causes the image data stored in the frame memories 6 and 7 to be written in an internal memory 26 and displayed on the display unit 3 (804), to thereafter perform an editing processing in accordance with the instructions from the keyboard 2 (805). The reduced image as it is may be displayed on the display unit 3, or an enlarged image of the reduced image may be displayed so as to match the size of the display unit 3.

In the example of the editing processing shown in FIG. 6, a rectangular area A defined by a diagonal interconnecting two points (0.1, 0.1) and (0.9 and 0.5) on the original image (1) and another rectangular area B defined by a diagonal interconnecting two points (0.2, 0.6) and (0.9, 0.9) on the original image (2) are cut out and synthesized to an image (3) such that the upper left corner of the rectangular area A cut out from the original image (1) is set at a point (0.2, 0.2) and the upper left corner of the image B cut out from the original image (2) is set at a point (0.3, 0.7). The original images (1) and (2) correspond to the reduced images stored in the frame memories 6 and 7, and the image (3) corresponds to an image subjected to cut-out and synthesis. A point or number pair (x, y) represents coordinate values of the image. The coordinate information, image cut-out instruction, and image synthesis instruction are entered by an operator via the keyboard 2.

The editing operations carried out by the operator, including the area designating coordinate values, alignment position coordinate values, are stored in the history memory 11 (806). The history memory 11 is written, as shown in FIG. 7, with an object image ID, an editing code representative of cutting out in a rectangular shape, the coordinate values representative of the cut-out starting point, the size of the rectangular area, and the coordinate values representative of the synthesis alignment position. The written values are not related to the size of an image, but are normalized vectors both in the vertical and horizontal directions using as an origin the upper left corner of an image.

After completion of the editing processing by an operator using the reduced images, encoded data for use in reproducing the original image data to be edited are read from the data base 5 under control of CPU 1, decoded by the decoder 10, and stored in the frame memories 6 and 7 (807). In accordance with the editing procedure data stored in the history memory 11, the image data having the size of original images stored in the frame memories 6 and 7 are edited to produce an edited image which is developed on the frame memory 8 (808). After obtaining the edited image of the original size, the edited image data are progressively encoded by the encoder 9 and sequentially stored in the data base 5 in the order starting from the lower progressive image data (809).

In the editing stage manually performed by an operator, reduced images having less data quantity are used thereby allowing high speed editing. The editing procedure data are written using relative values so that similar operations to those performed by the operator can be carried out in real time for the images of the original size without the aid of the operator.

As described so far, high speed editing processing can be attained by using lower resolution progressive image data stored in the data base. Also by using the lower resolution progressive image data, high speed image search can be attained.

In the above description, as an example of editing images, desired portions of two original images are cut out and synthesized. Editing image is not limited to the above example only, however but various editing processings are possible such as a rotation processing for the whole or part of an image, a magnification/reduction processing of an image, a synthesis processing for an image with characters or symbols, or the like. Also, in such editing processings, similar effects such as high speed processing can be obtained by using image data decoded from the lower resolution encoded data of the first stage among the progressively encoded image data, upon an editing instruction from an operator.

The present invention has been described by reference to the preferred embodiment. The invention is not limited thereto, however, but various changes and modifications are possible without departing from the scope of the appended claims.

What is claimed is:

1. An image editing method for editing an original image represented by encoded data obtained by progressively encoding an original image data, comprising the steps of:
   a first step, of decoding encoded low-resolution data representing the original image, among the encoded image data;
   a second step, of performing pre-editing processing on image data representing the low-resolution original image obtained in said first step;
   a third step, of storing editing procedure data representing the pre-editing processing carried out in said second step;
   a fourth step, of decoding encoded high-resolution data representing the original image, among the encoded data; and
   a fifth step, of performing actual editing processing on the high-resolution data obtained in said fourth step, in accordance with the editing procedure data stored in said third step, wherein, in said second step, the pre-editing processing is performed in accordance with an editing instruction from an operator, and the low-resolution data of the original is displayed.

2. An image editing method according to claim 1, further comprising a sixth step, of progressively encoding the image data subjected to the actual editing process in said fifth step.

3. An image editing method according to claim 1, wherein, in said fifth step, image data representing a part of the original image is retrieved from the high-resolution data representing the original image.

4. An image editing method according to claim 1, wherein, in said fifth step, image synthesis is performed.

5. An image editing apparatus for editing an original image, comprising:
   storage means for storing encoded data obtained by progressively encoding original image data;
   decoder means for decoding the encoded data read out from said storage means, wherein said decoder means further comprises a plurality of decoder units each for decoding encoded data of a mutually different resolution, representing the original image;
   display means for displaying low-resolution data representing the original image, in accordance with low-resolution data representing the original image, output from said decoder means;
   designation means for designating a desired editing process for the low-resolution data displayed by said display means;
   memory means for storing editing procedure data representing the editing process designated by said designation means;
   processing means for performing an editing process on high-resolution data representing the original image output from said decoder means, in accordance with the editing procedure data stored in said memory means and data indicating a desired part of the original image is stored as the editing procedure data 6. An image editing apparatus according to claim 5, wherein said designation means designates a desired part of the original image.

7. An image editing apparatus according to claim 5, wherein said display means further comprises frame memory means for storing the low-resolution data representing the original image to be displayed.

8. An image editing apparatus according to claim 5, wherein said processing means synthesizes a plurality of image data.

9. An image editing method for editing an original image represented by encoded data obtained by progressively encoding an original image, comprising the steps of:
   a first step, of decoding encoded low-resolution data representing the original image, among the encoded data;
   a second step, of displaying a low-resolution image, in accordance with the low-resolution data representing the original image and obtained in said first step;
   a third step, of storing editing procedure data representing a desired editing process, for the low-resolution image which is displayed and encoder means for progressively encoding the image data subjected to the editing process by said processing means;

a fourth step, of decoding encoded high-resolution data representing the original image, among the encoded data; and a fifth step, of performing an editing process on high-resolution image data representing the original image and obtained in said fourth step, in accordance with the editing procedure data stored in said third step.

10. An image editing method according to claim 9, wherein, in said fifth step, image data representing a part of the original image is retrieved from the image data representing the high resolution of the original image.

11. An image editing method according to claim 9, further comprising a sixth step, of progressively encoding the image data subjected to the editing process in said fifth step.

* * * * *

UNITED STATES PATENT AND TRADEMARK OFFICE
CERTIFICATE OF CORRECTION

PATENT NO. : 5,121,448
DATED : June 9, 1992
INVENTOR(S) : AKIHIRO KATAYAMA

It is certified that error appears in the above-identified patent and that said Letters Patent is hereby corrected as shown below:

IN [57] ABSTRACT

Line 8, "the" should be deleted and "with" should read --with the--.

COLUMN 1

Line 21, "inpractically" should read --impractically--.
Line 56, "the" should be deleted.
Line 67, "entirely" should read --entirety--.

COLUMN 2

Line 48, "history memory 8" should read --frame memory 8--.

COLUMN 3

Line 30, "the" (second occurrence) should be deleted.

COLUMN 4

Line 19, "where as" should read --where, as--.

COLUMN 5

Line 27, "Also" should read --Also,--.
Line 33, "however but" should read --however, but--.

UNITED STATES PATENT AND TRADEMARK OFFICE
CERTIFICATE OF CORRECTION

PATENT NO. : 5,121,448
DATED : June 9, 1992
INVENTOR(S) : AKIHIRO KATAYAMA

It is certified that error appears in the above-identified patent and that said Letters Patent is hereby corrected as shown below:

<u>COLUMN 6</u>

Line 39, "means and data indicating a desired" should read --means; and ¶ encoder means for progressively encoding the image data subjected to the editing process by said processing means.--.
Lines 40-41 should be deleted.
Line 65, "and encoder means" should read --and data indicating a desired part of the original image is stored as the editing procedure data;--.
Lines 66-68 should be deleted.

Signed and Sealed this

Twenty-fourth Day of August, 1993

Attest:

BRUCE LEHMAN

Attesting Officer

Commissioner of Patents and Trademarks